June 23, 1925.
G. S. CHILES
SPRING PLANK
Filed Dec. 5, 1923
1,543,055.
3 Sheets-Sheet 1
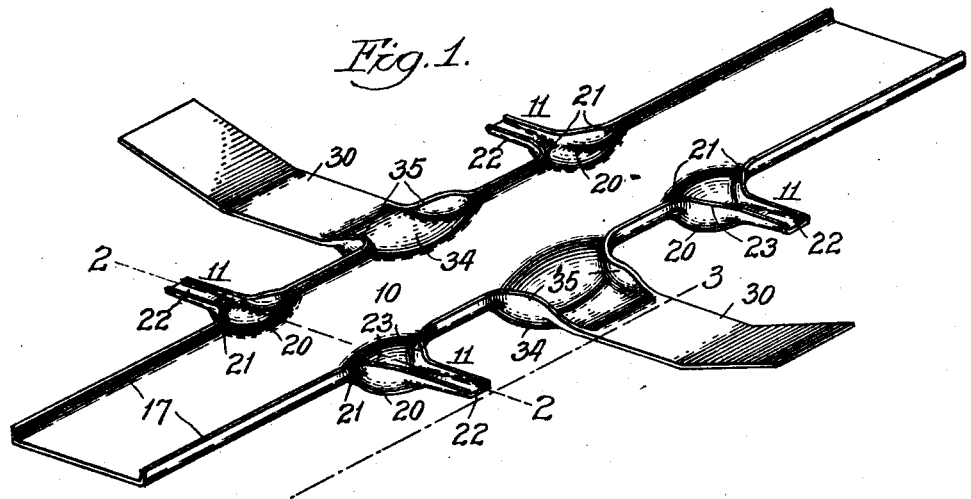
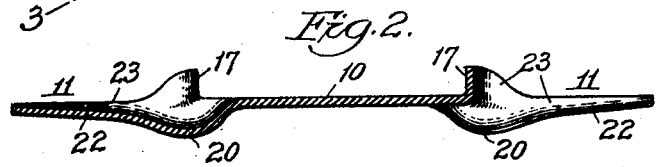
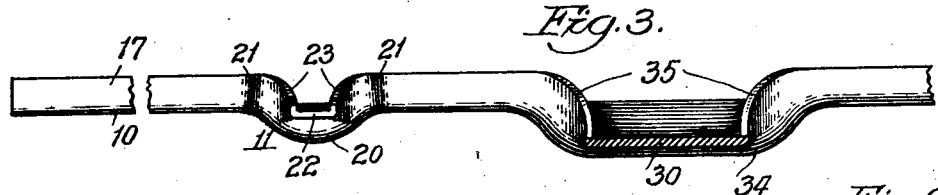
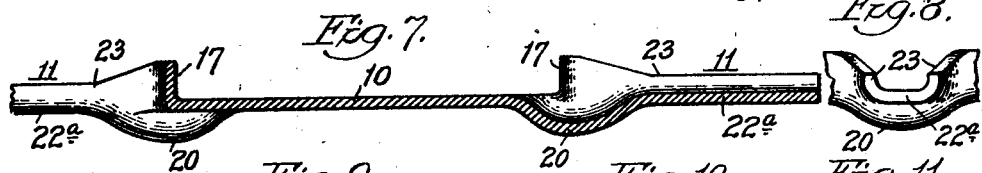
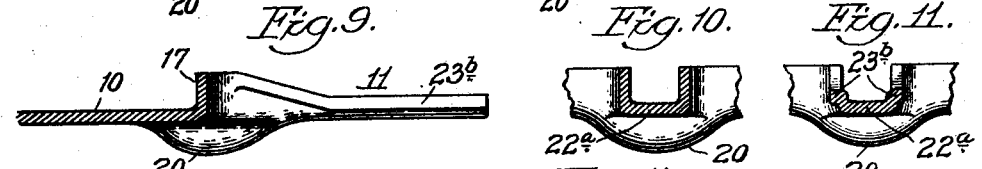
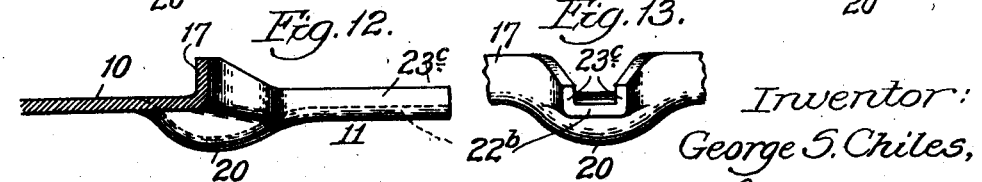
Inventor:
George S. Chiles, June 23, 1925.
G. S. CHILES
1,543,055
SPRING PLANK
Filed Dec. 5, 1923
3 Sheets-Sheet 2
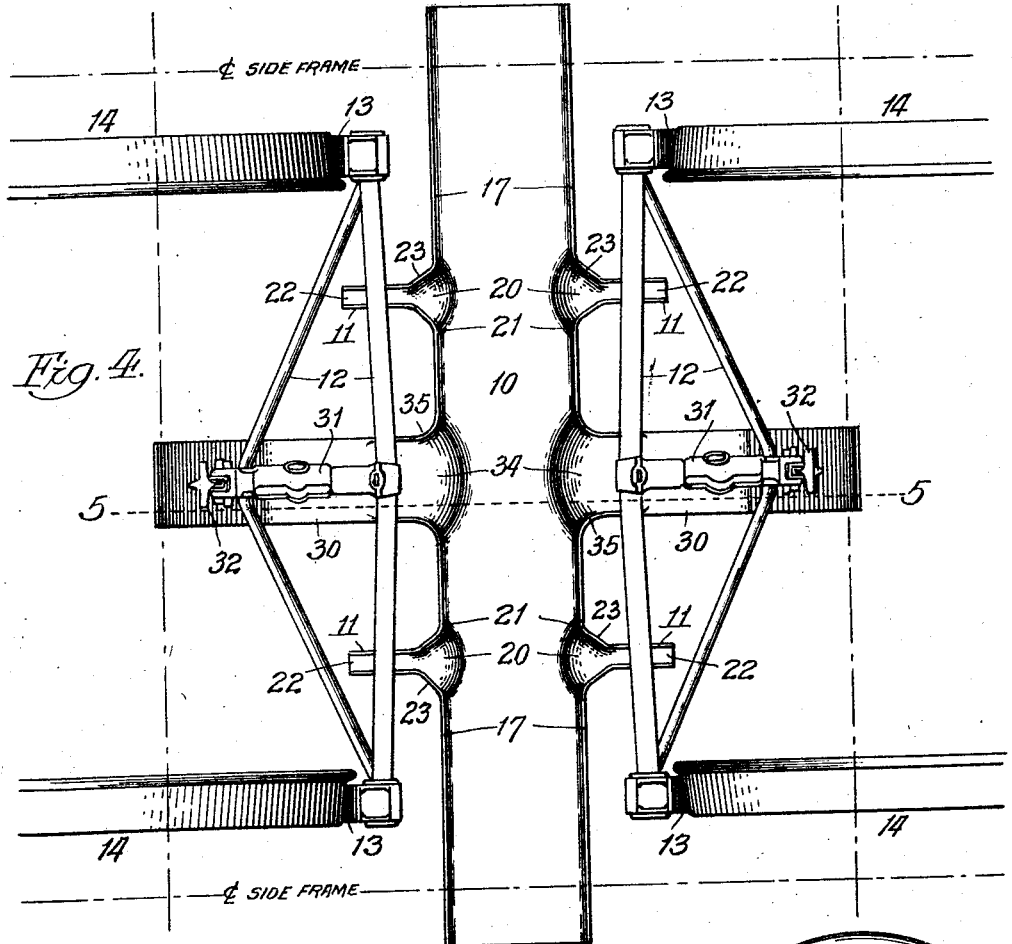
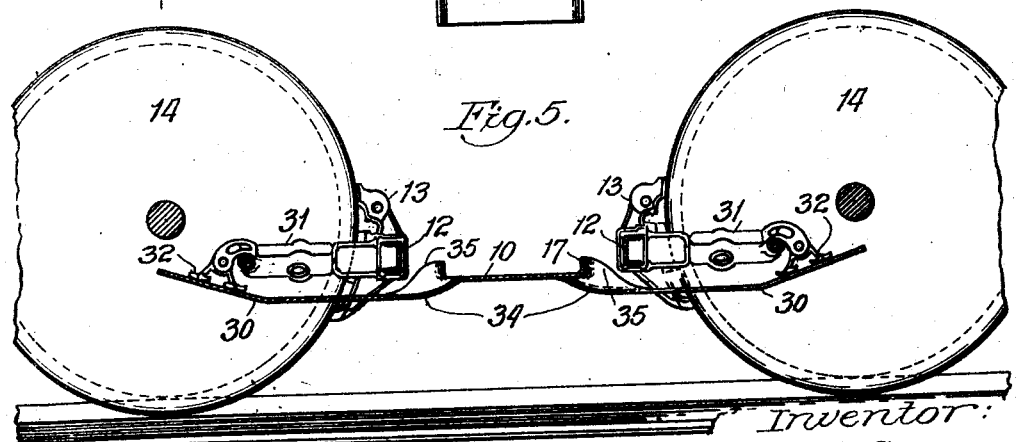
Inventor:
George S. Chiles,
Attys.

June 23, 1925.
G. S. CHILES
SPRING PLANK
Filed Dec. 5, 1923
1,543,055
3 Sheets-Sheet 3
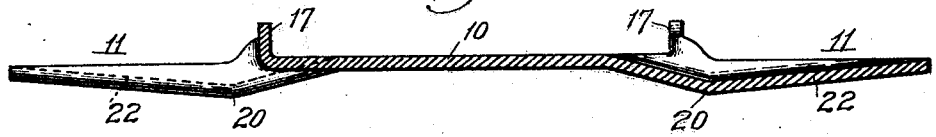
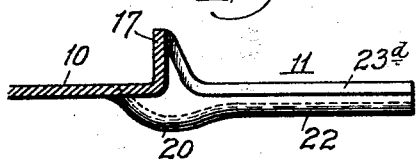
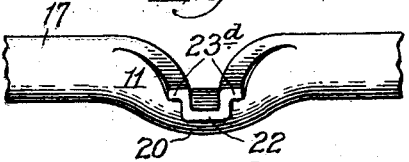
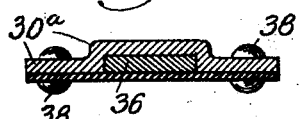
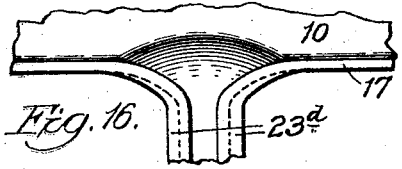
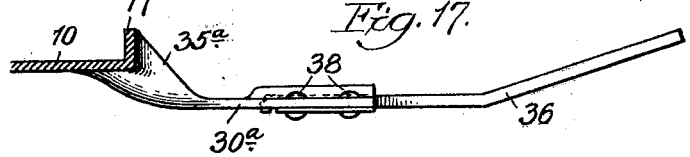
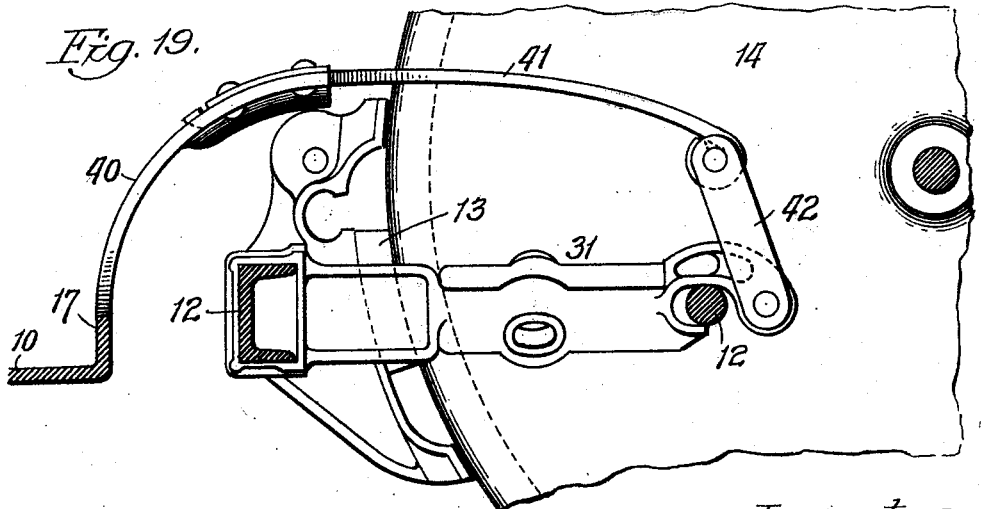
Inventor:
George S. Chiles,
Offield Bulkley Poole & Scott
Attys.

Patented June 23, 1925.

1,543,055

UNITED STATES PATENT OFFICE.

GEORGE S. CHILES, OF LIMA, OHIO, ASSIGNOR TO THE OHIO STEEL FOUNDRY COMPANY, OF LIMA, OHIO, A CORPORATION OF OHIO.

SPRING PLANK.

Application filed December 5, 1923. Serial No. 678,671.

*To all whom it may concern:*

Be it known that I, GEORGE S. CHILES, a citizen of the United States, and a resident of Lima, in the county of Allen and State of Ohio, have invented certain new and useful Improvements in Spring Planks, of which the following is a specification.

This invention relates to spring planks for car trucks, and the like, and has for its principal object to provide an improved construction and method of manufacturing the same including as an integral part thereof a supporting device for the car brakes. Other objects of the invention will appear from time to time as the description proceeds.

The invention may best be understood by reference to the accompanying drawings which illustrate certain preferred forms in which it may be embodied.

In the drawings,—

Figure 1 is a perspective view of one form of my improved spring plank.

Figure 2 is a transverse section taken on line 2—2 of Figure 1.

Figure 3 is a section taken on line 3—3 of Figure 1.

Figure 4 is a plan view of certain parts of the running gear of a railway car truck and illustrating the relation of the spring plank as utilized therewith.

Figure 5 is a section taken on line 5—5 of Figure 4.

Figure 6 is a transverse sectional view of one modified form of auxiliary brake beam support.

Figures 7 and 8 are details of another modified form of support.

Figures 9 and 10 and 11 are details of a third modification of brake beam support.

Figures 12 and 13 are details of a fourth modification.

Figures 14, 15 and 16 are details of a fifth modification.

Figures 17 and 18 are details of a modified form of central brake support.

Figure 19 is a detail of another form of central brake support.

Spring planks have heretofore been in common use in railway car trucks such planks extending between opposite side frames to provide a bearing support for the main springs, and tie the side frames together. Such planks heretofore usually consist of a relatively flat casting or forging, having suitable bearing surfaces at opposite ends for engagement with the respective springs and side frame members.

In the present invention, I provide a new form of spring plank which in addition to its usual function above described, may also provide support for certain parts of the brake mechanism which is ordinarily positioned adjacent thereto, and which heretofore has been supported by separate devices secured to the spring plank, or other portions of the running gear.

In carrying out my invention, one form of plank is illustrated in Figs. 1 to 5 inclusive, and comprises a main body portion 10, adapted to extend transversely of the truck between adjacent side frames in the usual manner. Details of the side frames and springs are omitted from the drawings as they form no part of the present invention, and their construction will be understood by those familiar with the art.

The improved form of spring plank is provided with integral projecting supporting members for certain parts of the adjacent brake mechanism. The plank is preferably forged so as to produce a structure presenting maximum strength for minimum weight, and the supporting projections are formed so as to retain the strength of the plank and yet providing a structure readily manufactured by the ordinary methods of forging.

As shown herein, one set of projections are provided as a safety device to support the brake beams in case of failure of the brake mechanism. These projections are indicated at 11, 11 and comprise relatively short extensions formed integral with the spring plank body and positioned underneath the brake beams 12, 12 which in standard truck construction extend transversely of the truck on opposite sides of the spring plank, as shown in Figs. 4 and 5. Said brake beams carry the brake shoes 13, 13, in position adjacent the truck wheels 14, 14. The brake mechanism may be supported by any suitable means as for instance, by the usual supporting devices (not shown) on the truck, or by novel supporting devices formed integral with the spring plank in accordance with a co-related part of the present invention as will presently be described. The auxiliary supports 11, 11 are normally spaced from the brake beams to permit freedom of movement thereof, and become operative only in case of such failure or breakage of the brake mechanism as may permit the brake beams to drop. The dropping of the brake beams is a frequent cause of serious accidents, as the brake shoes thereon are so positioned that they often cause derailment of the truck wheels. By reason of the provision of the projections 11, 11 however, the brake beams will be caught thereon, and this constant element of danger is thus rendered negligible, if not practically eliminated.

In order to permit the supports 11, 11 to fit beneath the brake beams in standard constructions, it is necessary that said supports extend at a slightly lower level than the main level of the spring plank body 10, as shown in Figs. 2 and 3. The plank body 10 is preferably formed with marginal flanges 17, 17 extending upwardly for strengthening the plank. In order to maintain the desired strength at the juncture of the plank body 10 and projections 11, 11 a depression 20 is formed at these points. The boundary of each depression extends inwardly part way from the lateral margin toward the center of the plank body 10, the metal being of substantially the same thickness as at other parts of said body portion. The marginal flanges 17, 17 are curved outwardly at the junction points as indicated at 21, 21, having their height increased at these points over the adjacent flanged portions by reason of the adjoining depressions 20, 20. As shown in Figs. 1, 2 and 3 the depressions may be gently curving in cross section. Fig. 6 illustrates a modified form in which the depression is formed somewhat angular in cross section. In all the forms illustrated, the arrangement is such that the strength of the plank is maintained by the provision of the depressions 20, 20 as described. Obviously, the construction lends itself especially to the forging or pressing of the plank from sheet metal stock, by which methods strength may be combined with lightness.

The shape of the projections 11, 11 may be varied in accordance with requirements of design. In Figs. 1, 2, and 3, one form is suggested in which the bottom wall 22 slopes upwardly from the adjacent depression 20, and the marginal flanges 23, 23 are upright and substantially flat along their upper margins. This form is particularly adapted for forming the auxiliary supports for the brake beams. Several modified forms of auxiliary supports are also shown. In the form shown in Figs. 7 and 8 the bottom wall 22$^a$ is substantially in horizontal alignment with the main body portion 10. In the form shown in Figs. 9, 10, 11, the side margins 23$^b$, 23$^b$ are flanged outwardly at the ends. Another form is shown in Figs. 12 and 13 in which the bottom wall 22$^b$ is below the level of the plank body, but the side walls 23$^c$, 23$^c$ are upright. A somewhat similar arrangement is shown in Figs. 14, 15 and 16 but in which the lateral walls are flanged outwardly at 23$^d$, 23$^d$.

The same general type of projections may also be formed on the plank body for the purpose of positively supporting the brake mechanism centrally of the frame. The plank shown in Figs. 1, 2, 3, 4 and 5 is provided with such supporting members 30, 30 arranged to extend laterally and below the brake hanger 31, which may be of any standard form, and including a sliding shoe 32, which rides on the supporting member 30 during operation of the brake. As shown in these figures, said member may be formed integral with the main body portion 10 of the plank, with strengthening depressions 34, 34 at the junction point, said depressions being similar in form and function to the depressions 20, 20 already described.

The side flanges 35, 35 of the latter projections extend a sufficient distance from the body portion to provide the desired strength to the plank adjacent the depression 34, but the flanges are preferably omitted from the supporting members 30, 30 beyond the point of intersection so as to afford flexibility of said supporting members relative to the brake mechanism which they support.

A modified form of brake support is shown in Figs. 17 and 18, in which said support is made up of two parts 30$^a$ and 36, the former being integral with the plank body 10, and formed with strengthening side flanges 35$^a$, 35$^a$ in the manner described, while the extension portion 36 is secured to part 30$^a$ in any suitable manner, as by rivets 38, 38.

Another form of brake supporting member is shown in Figure 19, in which the marginal flange 17 of the plank 10 is extended upwardly to form a laterally curving arm 40, to which an extension 41 is secured. The brake mechanism may be supported from above by a link 42, instead of being supported from other parts of the car or truck, and the extension 41 may also be semiflexible to compensate for slight relative displacement of the parts.

I claim as my invention:

1. A spring plank for car trucks comprising a relatively flat body portion and laterally extending projections integral therewith, having continuous marginal flanges along contiguous sides of said body portion and projections, and depressed areas at the intersections of said body portion and projections.

2. In a car truck in combination with a brake beam, a spring plank adjacent said beam provided with a pair of integral projections extending laterally beneath said brake beam, the plank being formed with a depressed area at the points of intersection of said projections and continuous marginal flanges along contiguous sides of said plank and projections.

3. In a car truck, in combination with brake mechanism, a spring plank adjacent said mechanism provided with a projection affording support for said brake mechanism, the plank being formed with a depressed area at the point of intersection of said projection, and continuous marginal flanges along contiguous sides of said plank and projection.

4. In a car truck, in combination with brake mechanism, a spring plank adjacent said mechanism provided with a projection affording a relatively flexible support for said mechanism, the plank being formed with a depressed area at the point of intersection of said projection, and continuous marginal flanges along contiguous sides of said plank and projection.

5. A spring plank for car trucks formed of sheet metal of substantially uniform thickness and comprising a body portion and laterally extending projections integral therewith, having continuous marginal flanges along contiguous sides of said body portion and projections, and depressed areas at the intersections of said body portion and projections.

6. A spring plank for car trucks comprising a relatively flat body portion and laterally extending projections integral therewith having continuous marginal flanges along contiguous sides of said body portion and projections, and depressed areas at the intersections of said body portion and projections, the metal of said depressed areas being substantially uniform in thickness with the body portion.

7. In a car truck, in combination with brake mechanism, a spring plank adjacent said mechanism provided with a projection affording support for said brake mechanism, the plank being formed with a depressed area at the point of intersection of said projection and continuous marginal flanges along contiguous sides of said plank and projections, the metal of said depressed areas being substantially uniform in thickness with the body portion.

8. As a new article of manufacture, a spring plank formed of pressed sheet steel and comprising a relatively flat body portion and laterally extending projections integral therewith, having continuous marginal flanges along contiguous sides of said body portion and projections, and depressed areas at the intersections of said body portion and projections.

In witness whereof, I hereunto subscribe my name this 16th day of November, A. D., 1923.

GEORGE S. CHILES.